(12) United States Patent
Uchida et al.

(10) Patent No.: US 8,737,010 B2
(45) Date of Patent: May 27, 2014

(54) SERVO CONTROL OF A DISK DRIVE

(75) Inventors: Hiroshi Uchida, Kanagawa (JP); Isao Yoneda, Kanagawa (JP); Chikako Sakagami, Kanagawa (JP); Kazuhisa Shishida, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 761 days.

(21) Appl. No.: 12/876,802

(22) Filed: Sep. 7, 2010

(65) Prior Publication Data

US 2011/0058276 A1     Mar. 10, 2011

(30) Foreign Application Priority Data

Sep. 7, 2009   (JP) ................................ 2009-206491

(51) Int. Cl.
    *G11B 5/596*   (2006.01)
(52) U.S. Cl.
    USPC .................. 360/77.02; 360/78.04; 360/77.08
(58) Field of Classification Search
    None
    See application file for complete search history.

(56) References Cited

U.S. PATENT DOCUMENTS

| 5,325,247 | A | * | 6/1994 | Ehrlich et al. ............. 360/78.09 |
| 6,014,285 | A | * | 1/2000 | Okamura ................... 360/78.04 |
| 7,016,142 | B2 | | 3/2006 | Jung et al. |
| 7,031,094 | B2 | | 4/2006 | Chung |
| 7,706,099 | B2 | | 4/2010 | Uchida et al. |
| 8,392,000 | B2 | * | 3/2013 | Levin et al. ..................... 700/37 |
| 2003/0058558 | A1 | * | 3/2003 | Ottesen et al. ................. 360/31 |
| 2004/0212913 | A1 | * | 10/2004 | Jung et al. ....................... 360/75 |
| 2007/0019321 | A1 | * | 1/2007 | Kim et al. .................. 360/78.04 |
| 2007/0268797 | A1 | * | 11/2007 | Abrishamchian et al. . 369/44.34 |

FOREIGN PATENT DOCUMENTS

| JP | 05159492 | 6/1993 |
| JP | 2004240972 | 8/2004 |
| JP | 2005149711 | 6/2005 |
| JP | 2008287815 | 11/2008 |

* cited by examiner

*Primary Examiner* — Andrew L Sniezek (57) ABSTRACT

A disk drive comprising a head for accessing a disk, an actuator for moving the head in the radial direction of the disk and a controller. The controller for servo control of the actuator based on servo data read out from the disk by the head. The controller is configured for maintaining a width of the adaptive chasing notch filter below a specified value in servo system control and estimating an oscillation frequency of the actuator.

10 Claims, 6 Drawing Sheets

SERVO CONTROL OF A DISK DRIVE

CROSS-REFERENCE TO RELATED APPLICATION

This application claims priority from the Japanese Patent Application No. 2009-206491, filed Sep. 7, 2009 the disclosure of which is incorporated herein in its entirety by reference.

BACKGROUND

Devices using various types of disks such as optical disks, magneto-optical disks, and flexible magnetic disks are known as disk drives. Of these, the hard disk drive (HDD) is used in many electronic devices, such as video recording and playback devices and car navigation systems, in addition to computer systems.

An HDD has a swinging actuator and a head slider supported by the actuator. The actuator is driven by a voice coil motor (VCM). Usually, the actuator has several mechanical resonance modes. Consequently, the servo system becomes unstable because of these modes, and mechanical oscillations occur at the characteristic frequencies (resonance frequencies).

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

A magnetic disk used in an HDD has a plurality of data tracks and a plurality of servo tracks formed in concentric circular shapes. Each servo track is comprised of a plurality of servo sectors containing address information. In addition, each data track is comprised of a plurality of data sectors containing user data. The data sectors are recorded between servo sectors which are separated in the circumferential direction.

An HDD has a swinging actuator and a head slider supported by the actuator. The HDD reads out the address information of the servo sectors by the head slider and controls the actuator in accordance with the address information (servo control). Thus, the HDD can move (seek) the head slider to the desired radial position (target data track) and can position at that location (following). The head slider positioned at the target data track writes data to or reads data from the target data sector in the track.

The actuator is driven by a voice coil motor (VCM). Usually, the actuator has several mechanical resonance modes. Consequently, the servo system becomes unstable because of these modes, and mechanical oscillations occur at the characteristic frequencies (resonance frequencies).

Therefore, a conventional HDD uses a notch filter in the servo control of the head slider. The notch filter is inserted on the output side of the controller in the servo loop of the head slider and has a center frequency which is the same as a resonance frequency of the actuator. The notch filter reduces the servo gain at the oscillation frequency included in the control signal to stabilize the servo control of the head slider.

Accompanying the increase in the tracks per inch (TPI) in an HDD, an increase in the servo band is sought in order to maintain the positioning precision of the head. One factor impeding the increase in the servo band is the consumption of the phase margin by the phase delay caused by the notch filter. If the consumption of the phase margin can be lowered, the servo band can be increased.

However, conventionally, a notch filter is designed so that consumption of the phase margin is limited, and the oscillation problem is not produced in a servo system under a variety of conditions such as variations in the mechanical parts or temperature fluctuations. The consumption of the phase margin is difficult to further reduce without increasing the risk of servo system oscillations. Therefore, smaller variations of the mechanical parts and optimally setting each servo system individually at the manufacturing plant are expected. However, both increase costs, and simpler methods are sought.

On the other hand, a phenomenon was discovered where oscillations were caused by the method for securing the HDD in the system. These oscillations did not occur in the tests during manufacturing or in a single HDD unit because the oscillations began when installed in the system. Therefore, only measures which preventatively added notch filters could be adopted; the consumption of the phase margin increased; and the servo band became more difficult to increase.

Therefore, the next proposed technology estimates the frequency during oscillation and generates the notch filter required to stop the oscillation. Thus, the notch filter which is used preventatively against mechanical oscillations having a low probability of oscillation can be omitted, or the filter width can be narrowed. In addition, the consumption of the phase margin can be suppressed resulting in an increase in the servo band.

Some technologies use the technique of a frequency-following peak filter (adaptive chasing notch filter). The peak filter is positioned in the servo loop parallel to a main controller and acts to suppress the oscillations of the actuator (head slider) caused by external oscillations.

The external oscillation frequency can be estimated by using the denominator of the peak filter. The adaptive chasing notch filter estimates the external oscillation frequency, and gradually moves the peak frequency closer to the external oscillation frequency. The denominator of a peak filter has the same shape as the numerator of a notch filter. Consequently, even if the numerator of the notch filter is used, the external oscillation frequency can be similarly estimated.

However, the object of the suppression by the notch filter is not the actuator oscillations caused by external oscillations, but the oscillations caused by the actuator oscillations. It was found that a conventional implementation method of an adaptive chasing notch filter cannot be applied without modification to the frequency-following notch filter (adaptive chasing notch filter) because of the difference between external oscillations and actuator oscillations.

The adaptive chasing peak filter described in the present technologies estimates the frequency of the external oscillations and updates the peak frequency so that the peak frequency approaches the oscillation frequency. By repeating this process, the peak frequency of the adaptive chasing peak filter approaches and finally matches the external oscillation frequency (actuator oscillation caused by external oscillation). The suppression target of the adaptive chasing peak filter is the oscillation of the actuator (head slider) caused by the external oscillation. Even if the peak frequency of the peak filter matches the external oscillation frequency, the actuator oscillation caused by the external oscillation is not completely stopped. Consequently, the peak frequency can be made to gradually approach the external oscillation frequency and converge at that value.

On the other hand, the adaptive chasing notch filter estimates the oscillation frequency of the actuator and gradually moves the center frequency of the notch filter closer to the oscillation frequency. In contrast to external oscillations, the oscillations caused by actuator oscillations are eliminated when the oscillation conditions are removed. Therefore, before the oscillation frequency is correctly estimated (before the center frequency of the notch filter matches the oscillation frequency), the oscillations stop when the oscillation conditions are removed by the skirt of the notch filter.

The oscillation frequency cannot be estimated after the oscillations stop, and the optimal notch filter cannot be generated. In addition, when oscillations caused by the actuator oscillations do not exist, the problem is that the frequency is estimated for smaller oscillations; the center frequency of the notch filter moves; and the oscillations resume.

The disk drive in an embodiment of the present invention has a head for accessing the disk, an actuator for moving the head in the radial direction of the disk, and a controller for conducting the servo control of the actuator by using the servo data read out from the disk by the head. While maintaining the width of the adaptive chasing notch filter which performs the filter computations in the servo control system below the specified value, the controller references the internal variables of the adaptive chasing notch filter, and repeatedly estimates the oscillation frequency of the actuator and updates the center frequency in response to the estimation result. Furthermore, the controller increases the width after the center frequency converges at the oscillation frequency. Thus, the difference between the oscillation frequency of the actuator and the center frequency of the notch filter can be set in the desired range and the oscillations of the actuator can be effectively suppressed.

In one embodiment, the specified value is 0. Thus, the center frequency of the notch filter can approach the oscillation frequency of the actuator more appropriately.

In another embodiment, the controller repeatedly estimates and updates the center frequency in response to the estimation result to gradually move the center frequency closer to the oscillation frequency, changes the magnitude relationship between the center frequency and the oscillation frequency, and ends the estimation of the oscillation frequency and the update of the center frequency. Thus, the difference between the oscillation frequency of the actuator and the center frequency of the notch filter can be set in the desired range by a simple structure.

In another embodiment, the controller repeatedly estimates and updates the center frequency in response to the estimation result and increases the update quantity of the center frequency in response to the number of consecutive updates having the same sign for the center frequency. Thus, the convergence speed of the center frequency can be accelerated.

In a further embodiment, the maximum value of the absolute value of the update quantity of the center frequency is specified. Thus, the center frequency is not too much larger than the oscillation frequency.

In yet another embodiment, the controller compares the magnitude of the value in the estimation calculation of the oscillation frequency to a threshold. If the value is greater than the threshold, the estimation of the oscillation frequency and the update of the center frequency are executed. Thus, the effects of noise can be reduced.

In a further embodiment, the controller uses a function value which represents the oscillations of the actuator with the position error signal set as the variable in order to judge whether the oscillations of the actuator have stopped, and determines the width of the adaptive chasing notch filter based on the value of the width when the oscillations stop. Thus, an appropriate width for stopping the oscillations can be set.

In another embodiment, the controller determines a value Wmin greater than the value of the width for stopping the oscillations for the width of the adaptive chasing notch filter. Thus, oscillations can be prevented more reliably.

In one embodiment, in the judgment about the stopping of the oscillations, the controller compares the function value and a first threshold to judge whether the oscillations have stopped, and increases the width when the function value is between a second threshold which is smaller than the first threshold and the first threshold, and when the value of the width is less than the value Wmin. Thus, the margin can be maintained in the notch filter.

In one embodiment, when the function value is less than a third threshold which is less than the second threshold, and the width is greater than Wmin, the controller decreases the width. Thus, the actuator oscillations are more reliably prevented.

In one embodiment, the maximum value of the width is specified, and the controller determines the width at a value less than the maximum value. Thus, the servo system is prevented from becoming unstable.

In another embodiment, the maximum value is represented by a function of the center frequency. Thus, the servo system can be more reliably prevented from becoming unstable.

In a further embodiment, the controller uses the filter coefficients determined by the adaptation of the adaptive chasing notch filter to set a new fixed notch filter. Thus, the fixed notch filter can be appropriately set.

In another embodiment, the controller references the internal coefficients at the single sampling rate timing, and the adaptive chasing notch filter operates at the multiple sampling rate. Thus, in this simple structure, oscillations can be suppressed by the adaptive chasing notch filter.

In one embodiment, the controller calculates the difference of values of the same internal variable at different sampling times in the frequency estimation and removes the DC components of the internal variables. Thus, the DC components in the internal variables can be removed and the oscillation frequency of the actuator can be appropriately estimated by a simple structure.

An embodiment of the present invention is described below. To clarify the description, the descriptions and drawings are omitted or simplified when appropriate. In each drawing, the same reference numbers are assigned to the same elements. To clarify the descriptions, duplicate descriptions are omitted as needed. The embodiment of the present invention is described below for a hard disk drive (HDD), which is an example of a disk drive.

In various embodiments, the HDD has a notch filter with a variable center frequency in the servo control system (servo loop). The center frequency of the notch filter is the frequency having the smallest gain, and the filter shape is symmetric or asymmetric with respect to the center frequency. The HDD estimates the oscillation frequency of the actuator and moves the center frequency of the notch filter closer to that frequency. The HDD repeats the estimation of the oscillation frequency and the update of the center frequency, and sets the center frequency in the desired range from the oscillation frequency. Thus, the notch filter in the embodiment is a frequency-following adaptive notch filter (adaptive chasing notch filter).

Figure 1:
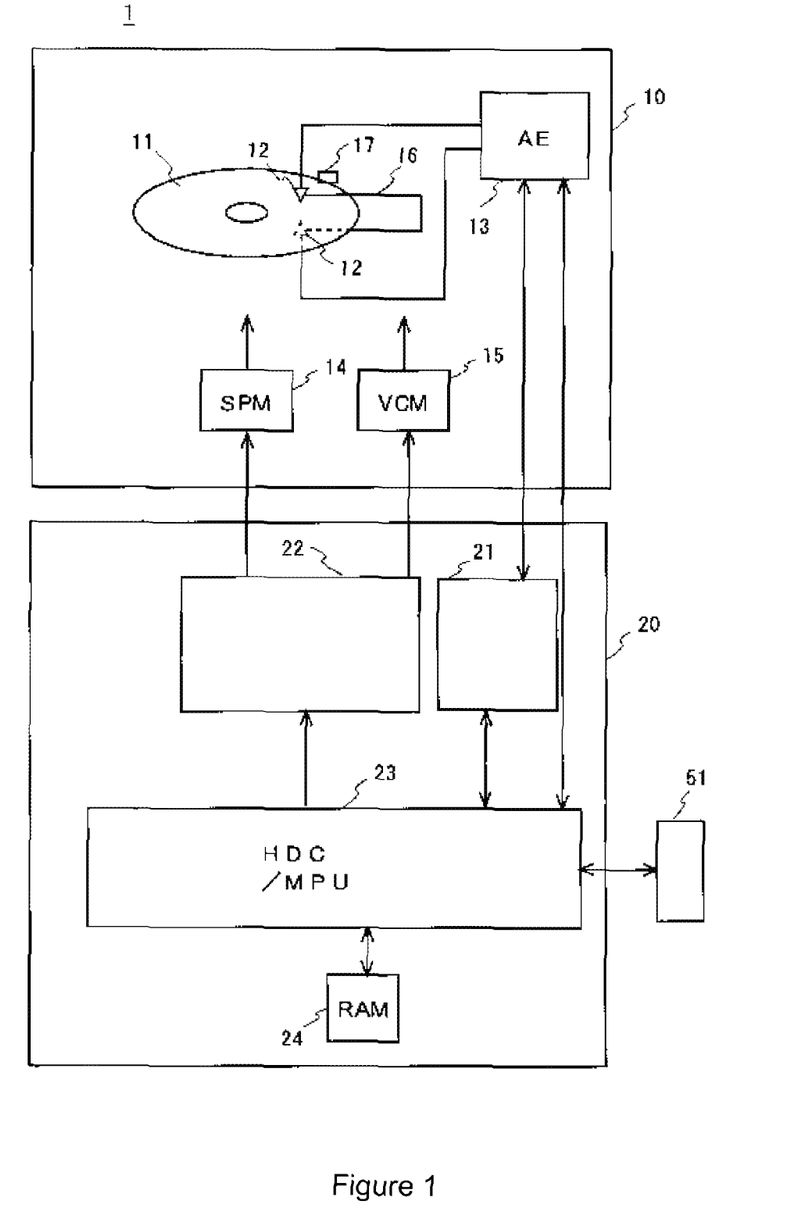
FIG. 1 is a block diagram schematically depicting the HDD, in accordance to an embodiment of the present invention.

FIG. 1, HDD 1 has a magnetic disk 11, which is the disk for storing data, in an enclosure 10. A spindle motor (SPM) 14 rotates the magnetic disk 11 at the specified angular velocity. A head slider 12 for accessing the magnetic disk 11 is set up for each recording surface of the magnetic disk 11. Access is the high-level concept of reading and writing.

Each head slider 12 is provided with a slider which flies above the magnetic disk and a head element which is secured to the slider and converts between magnetic signals and electrical signals. Each head slider 12 is secured to the tip of an actuator 16. The actuator 16 is connected to a voice coil motor (VCM) 15 and swings about the swinging shaft at the center to move the head slider 12 in the radial direction above the rotating magnetic disk 11.

The actuator 16 has a voice coil on the side opposite the head slider 12 and sandwiches the swinging shaft, and the voice coil constitutes a part of the VCM 15. The drive force is applied to the voice coil by the drive current flowing in the voice coil in the magnetic field from a magnet. A ramp 17 is fixed inside of the enclosure 10 near the outer peripheral edge of the magnetic disk 11. When the power supply of the HDD 1 is off or idle, the actuator 16 stops on the ramp 17 on the outer side of the magnetic disk 11. Typically, the front projection of the actuator 16 slides on the ramp 17. In one embodiment, this can be applied to a contact start and stop (CSS) HDD in which the actuator 16 lands on the specified area in the magnetic disk 11 and stops.

Circuit elements are mounted on a circuit board 20 secured to the outer side of the enclosure 10. A motor driver unit 22 drives spindle motor (SPM) 14 and the VCM 15 in accordance with the control data from an HDC/MPU 23. A RAM 24 functions as a buffer for temporarily storing the read data and the write data. Arm electronics (AE) 13 in the enclosure 10 select the head slider 12 to access the magnetic disk 11 from a plurality of head sliders 12, amplifies the playback signal, and transmits the signal to a read/write channel (RW channel) 21. In addition, the recording signal from the RW channel 21 is transmitted to the selected head slider 12. The present invention can be applied to an HDD having only one head slider 12.

In a read process, the RW channel 21 amplifies the read signal supplied from the AE 13 to a constant amplitude, extracts the data from the acquired read signal, and decodes the data. The read-out data includes user data and servo data. The decoded read user data and servo data are transmitted to the motor drive unit (HDC/MPU) 23. In addition, in a write process, the RW channel 21 code modulates the write data transmitted from the HDC/MPU 23, transforms the code-modulated write data into a write signal, and supplies the signal to the AE 13.

The HDC/MPU 23, which is the controller, controls the required processes related to data processing, such as read/write process control, command execution order management, positioning control (servo control) of the head slider 12 (actuator 16) using the servo data, interface control with a host 51, defect management, and error handling process when an error is generated, and the overall control of the HDD 1.

In one embodiment, the HDC/MPU 23 has a plurality of notch filters connected in series in the servo system of the head slider 12 (actuator 16). The HDC/MPU 23 adapts the center frequency of one or a plurality of the notch filters in response to the oscillation frequency of the actuator 16. Specifically, the center frequency is matched to the oscillation frequency of the actuator 16. Thus, the oscillations of the actuator 16 which vary with the assembly variations of the HDD 1 or the system with an installed HDD 1 can be effectively suppressed.

When a read/write command is fetched from the host 51, the HDC/MPU 23 starts a seek. The HDC/MPU 23 moves (seeks) the head slider 12 to the data track (target data track) at the address indicated by the command from the current radial position. The HDC/MPU 23 converts the address specified by the command into a servo address for specifying the target radial position. When the seek ends, HDC/MPU 23 maintains the head slider 12 above the target data track (following).

In a seek or a following, HDC/MPU 23 uses the servo data read out from the recording surface to control the actuator 16 (VCM 15). Generally, seek control controls the actuator 16 (VCM 15) by velocity control and position control which use the servo data. In following control, the HDC/MPU 23 controls the positioning so that the current radial position (servo address) of the head slider 12 and the target radial position (servo address) are within the specified range.

The servo sectors are formed at nearly equal intervals and separated in the circumferential direction on the recording surface. Consequently, the head slider 12 reads out servo data at a constant period (servo sampling period). HDC/MPU 23 controls the drive current of the VCM 15 in response to the position error signal which indicates the position error of the current servo address indicated by the servo data and the target servo address.

Figure 2:
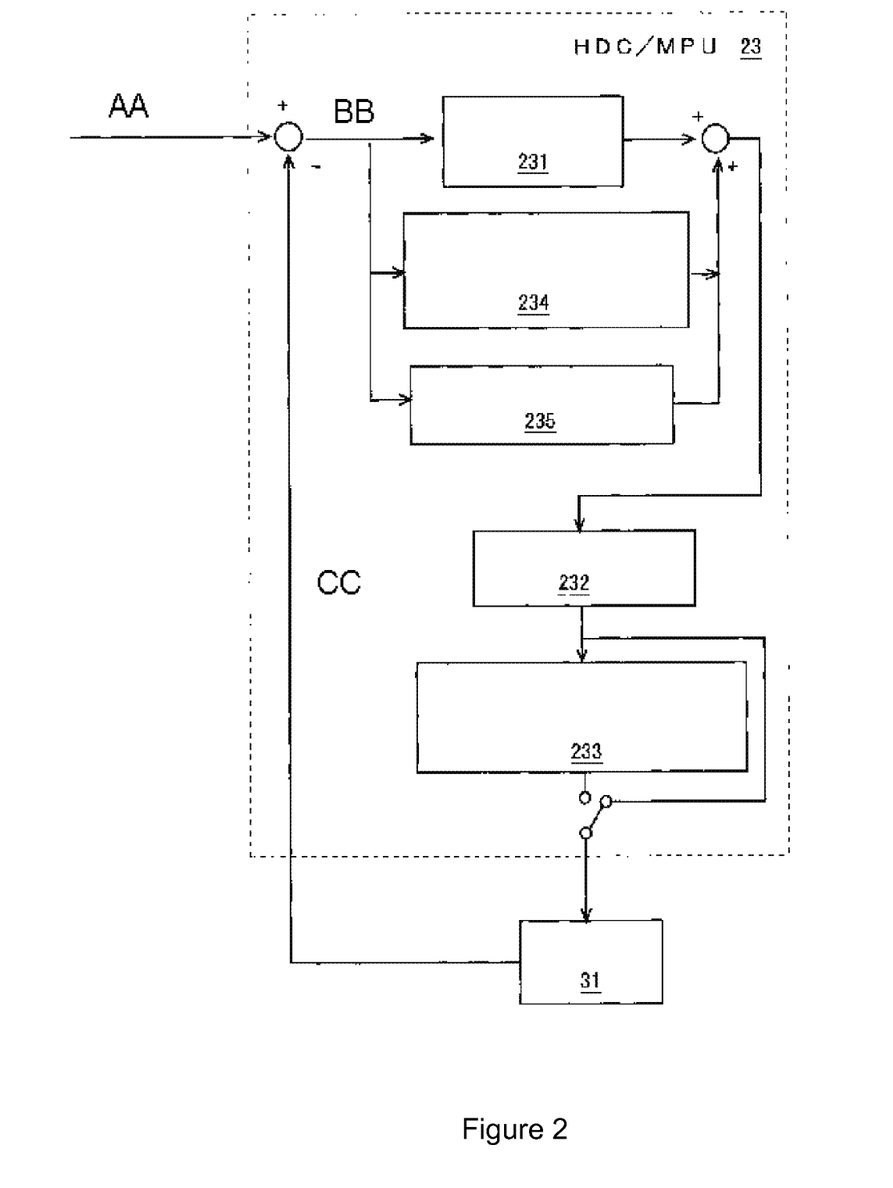
FIG. 2 is a block diagram modeling the servo control system in the HDD, in accordance to an embodiment of the present invention.

FIG. 2 is a block diagram modeling the servo control system in the HDD 1, in accordance to an embodiment of the present invention. Each block indicates a transfer function. In FIG. 2, a control target 31 is the servo control target of the HDC/MPU 23 and includes the motor driver unit 22, VCM 15, actuator 16, and head slider 12. The operation quantity of the control target 31 is the control data from the HDC/MPU 23 to the motor driver unit 22 and represents the drive current value of the VCM 15. Feedback from the control target 31 is a signal (data) indicating the current radial position of the head based on the servo data read out by the head slider 12.

In this embodiment, the servo control system in the HDC/MPU 23 has a main servo controller 231, a fixed notch filter 232, an adaptive chasing notch filter 233, an adaptive chasing peak filter 234, and a fixed peak filter 235. The types and number of notch filters and peak filters are appropriately designed. FIG. 2 shows an example of the simplified structure in order to describe this embodiment. For example, the HDC/MPU 23 may have a plurality of fixed notch filters, a plurality of adaptive chasing notch filters, a plurality of adaptive chasing peak filters, and a plurality of fixed peak filters.

Alternately, there may not be adaptive chasing peak filters and only fixed peak filters. Typically, these function elements are implemented by hardware in the HDC/MPU 23, but a portion of the functions may be implemented by the calculations of the MPU. In an embodiment, the notch filters and the peak filters are built from hardware to implement the processes without delays.

The main servo controller 231 calculates the VCM current value (control data representing the current) in response to the position error signal. Since the control by the main servo controller 231 is basically proportional-integral-derivative (PID) control, it is difficult to handle large oscillations of the head slider 12 (actuator 16) while maintaining control stability. Therefore, HDC/MPU 23 has notch filters 232, 233 arranged in series at the output of the main servo controller 231 and peak filters 234, 235 connected in parallel to the main servo controller 231.

The notch filters 232, 233 act to suppress the oscillations of the actuator 16. The components corresponding to the oscillation frequencies of the actuator 16 in signals from the main servo controller 231 can be reduced, and large oscillations at the oscillation frequency of the actuator 16 can be suppressed. Typically, the maximum gain of the notch filters is 1.0 (0 dB). The notch filters have the smallest gain at the center frequency. This gain increases as the frequency moves away from the center frequency. The filter shape is usually symmetric with respect to the center frequency, but may be asymmetric.

The filter shape of the fixed notch filter 232 is fixed (invariant). Specifically, the values for specifying the filter shape, such as the center frequency, the half width, and the gain at the center frequency, are fixed. The filter shape of the adaptive chasing notch filter 233 is variable. In this embodiment, HDC/MPU 23 can set the center frequency and the width (usually, the half width) in response to the oscillations of the actuator 16. Values other than these can be set. The gain may be a function of the half width and/or the center frequency, or the gain may be constant.

At least a portion of the oscillation frequencies (frequencies exhibiting large oscillations) of the actuator 16 is known in the design. Therefore, fixed notch filters having center frequencies which correspond to these oscillation frequencies can be prepared, and the oscillations of the actuator 16 can be effectively suppressed by a simple structure. An appropriate number of mounted fixed notch filters is selected in accordance with the design of HDD 1.

The oscillations of the actuator 16 change depending on conditions such as the assembly variations, the temperature, and the fixing state in the system having an installed HDD 1. Therefore, the adaptive chasing notch filters 233 are installed in the HDD 1. The HDC/MPU 23 suppresses the oscillations of the actuator 16 by appropriately setting the filter characteristics of the adaptive chasing notch filter 233.

The peak filters 234, 235 act to suppress the oscillations of the head slider 12 (actuator 16) caused by noise. The noise includes repeatable run-out (RRO) caused by disk eccentricity. The fixed peak filter 235 knows the peak frequency in advance and operates so that the peak frequency suppresses regular oscillations. The center frequency (peak frequency) of the fixed peak filter 235 is fixed. Generally, the peak frequency, the gain, and the filter shape are fixed. An appropriate value is selected for the number of mounted fixed peak filters based on the design of the HDD 1.

In contrast, the adaptive chasing peak filter 234 has the action where the frequency caused by external oscillations suppresses the irregular oscillations. An appropriate number is selected for the number of mounted fixed peak filters and adaptive chasing peak filters in accordance with the design of the HDD 1. In addition, if not needed in the design, one or both of these filters may be omitted.

HDC/MPU 23 generates the data (signal) indicating the current radial position of the head slider 12 from the servo data read out by the head slider 12 included in the control target 31. HDC/MPU 23 holds the data indicating the target radial position specified by a command from the host 51. HDC/MPU 23 calculates the position error signal (data), which is the difference between the target radial position and the current radial position.

The main servo controller 231 conducts the specified calculation process for the position error signal to calculate the VCM current value for moving the head slider 12 closer to the target radial position (suppress position errors). The position error signal is also input to a plurality of peak filters 234, 235 connected in parallel to the main servo controller 231. Each of the peak filters 234, 235 has a filter shape which has a maximum gain at the peak frequency and a larger reduction in the gain when moving away from the peak frequency. Therefore, the characteristic frequency component in the position error signal becomes the filter output.

The outputs of the peak filters 234, 235 are added to the output from the main servo controller 231, and the total value (signal) is applied to the notch filters 232, 233. Each of the notch filters 232, 233 is designed so that the minimum gain is at the center frequency, and the gain and the phase characteristics produce a stable system. Therefore, the servo gain becomes smaller at and near the center frequencies of the notch filters and becomes stable, and the oscillations of the actuator 16 stop.

The HDC/MPU 23 in this embodiment features controlling the adaptive chasing notch filter 233. The fixed notch filter 232 operates in the servo loop. In one embodiment, the adaptive chasing notch filter 233 operates in the servo loop when oscillations start and is passed through when oscillations do not start. Therefore, an unneeded notch filter is removed from the servo loop, and the stability of servo control is improved by not having the phase margin consumed by the unneeded notch filter. Based on this design, the adaptive chasing notch filter 233 may operate in servo control.

Figure 3:
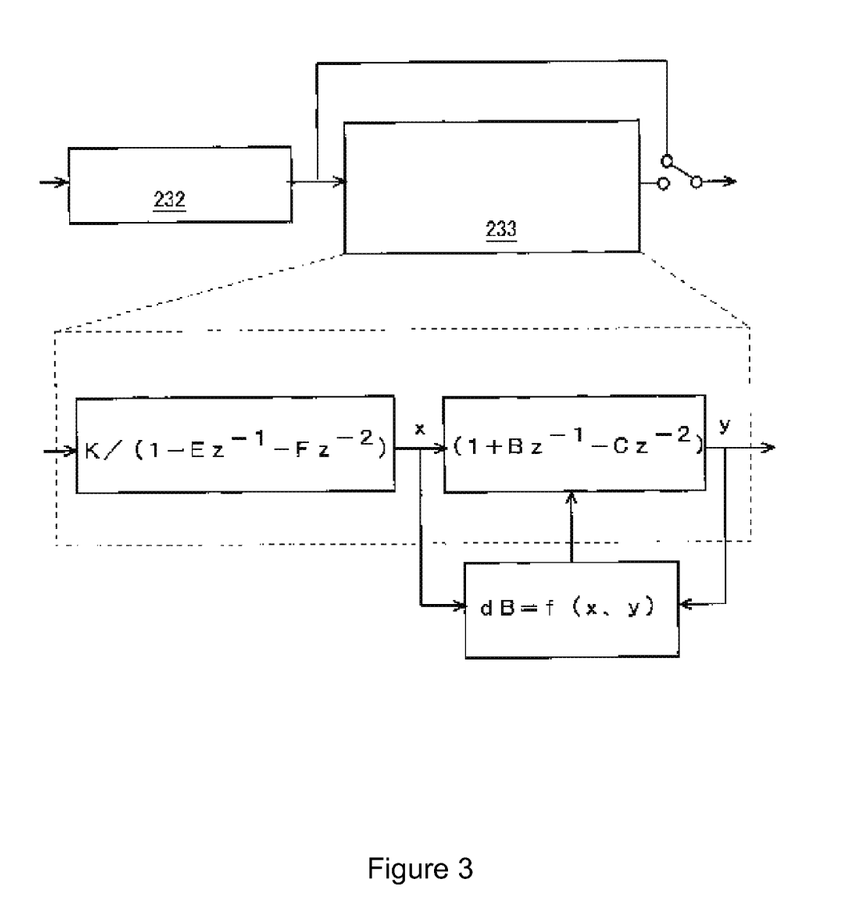
FIG. 3 is a diagram showing the function which represents the adaptive chasing notch filter and the update quantity of the center frequency, in accordance to an embodiment of the present invention.

HDC/MPU 23 of this embodiment references the internal variables of the adaptive chasing notch filter 233 and estimates the oscillation frequency. FIG. 3 shows the adaptive chasing notch filter 233 and the function illustrating the update quantity of the center frequency. HDC/MPU 23 references the internal variables x,y. The shift quantity (update quantity) of the center frequency in response to the estimated oscillation frequency is dB and is a function of the internal variables x,y. The shift quantity dB indicates the increase or decrease in the center frequency, and is positive for an increase and negative for a decrease. Thus, the shift quantity dB includes a positive or a negative sign. As shown in FIG. 3, a notch filter can be represented by the following equation.

$$(K/(1-Ez^{-1}-Fz^{-2}))\times(1+Bz^{-1}+Cz^{-2}) \quad \text{(Equation 1)}$$

The center frequency of the notch filter 233 is determined by B in equation 1. Namely, B is the value which represents the center frequency. HDC/MPU 23 uses the input x and the output y of the numerator $(1+Bz^{-1}+Cz^{-2})$ in equation 1 to estimate the oscillation frequency. Specifically, HDC/MPU 23 estimates the oscillation frequency by determining the magnitude relationship between the current center frequency of the notch filter 233 and the oscillation frequency from the internal variables x,y. The center frequency changes in response to this estimate.

This frequency estimation method and the method for updating the filter frequency are similar to the methods used in the adaptive chasing peak filter 235. The peak filter and the notch filter can be represented by the same general equation as a two-dimensional IIR filter. The value representing the center frequency appears in the denominator of the peak filter and in the numerator of the notch filter.

However, because the notch filter has different characteristics than the peak filter in the servo system, the frequency-adaptive method in the peak filter cannot be applied without modification to the notch filter. One reason is the sampling rate difference between the notch filter and the adaptive filter. Another reason is the presence of DC components in the input and the output of the notch filter. Yet another reason is the difference in the source of the oscillations. The methods which respond to the differences between the notch filter and the adaptive filter are described below for the adaptation of the adaptive chasing peak filter 235.

The description begins with the solution method for the problems of the difference in the sampling rates and the presence of DC components. Generally, the resonance frequency of the mechanical resonance mode of the actuator 16, which is the target of the notch filter, includes frequencies higher than the servo sampling frequency. Therefore, in a typical servo system for an HDD, the operating frequency of the notch filter is higher than the servo sampling frequency. Specifically, the operating frequency of the notch filter is an integral multiple (integer of 2 or more) of the servo sampling frequency.

Thus, the notch filters 232, 233 operate at the multiple sampling rate. On the other hand, in the servo system, other elements which are different than the notch filters, such as the main servo controller 231 and the peak filters 234, 235, operate at a single sampling rate. Therefore, depending on the design, HDC/MPU 23 can reference the internal variables x,y only at the single sampling rate and cannot reference at the multiple sampling rate.

In addition, the inputs and outputs of the notch filters 232, 233 are data showing the drive currents of the VCM 15. The values of these inputs and outputs include DC components. Since a bias force is applied to the actuator 16, a drive force to resist the bias force is generated by the VCM 15.

In the estimation of the oscillation frequency by using the internal variables x,y, HDC/MPU 23 removes the abovementioned DC components. When DC components exist, HDC/MPU 23 mistakenly recognizes the start of oscillations at the frequency of the DC components, that is, 0 Hz, and matches the adaptive chasing notch filter 233 to 0 Hz.

The HDC/MPU 23 in this embodiment references at the single sampling rate the internal variables x,y of the adaptive chasing notch filter 233 operating at the multiple sampling rate, and uses the referenced internal variables x,y to estimate the oscillation frequency. Furthermore, HDC/MPU 23 removes the abovementioned DC components in the calculation of the internal variables x,y in the estimation of the oscillation frequency. For example, by using a simple calculation, HDC/MPU 23 estimates the oscillation frequency at the single sampling rate and removes the abovementioned DC components.

HDC/MPU 23 can determine the shift quantity dB(n) for the center frequency of the adaptive chasing notch filter 233 by using the following Equation 2.

$$dB(n)=\Delta B\times x(n-1)\times y(n), \quad \text{(Equation 2)}$$

where n is the multiple rate sampling time; and $\Delta B$ is a constant, or a function of internal variables x and y, or a function of other variables.

When the magnitude relationship of the center frequency of the notch filter 233 and the oscillation frequency is an inverse relationship, the sign of $x(n-1)\times y(n)$ changes. HDC/MPU 23 can use this characteristic to adjust the center frequency to match the center frequency to the oscillation frequency, and identify the oscillation frequency.

Equation 2 uses the internal variables x,y at the multiple sampling rate. Consequently, when HDC/MPU 23 can reference the internal variables x,y only at the single sampling rate, the calculation in Equation 2 above cannot be used. In this structure, HDC/MPU 23 determines the shift quantity dB (m) in accordance with the following Equation 3.

$$dB(m)=\Delta B\times((1-z^{-M})\times x(m-1))\times((1-z^{-M})\times y(m)) \quad \text{(Equation 3)}$$

Variable m is the single sampling rate time. The multiple sampling rate is M times the single sampling rate, m=M×n. Variable M is an integer of at least 2 and is a constant number. The "−1" in $x(m^{-1})$ denotes a delay of one sample at the multiple sampling rate. The variable $z^{-M}$ is $(z^{-1})^M$. The operator $z^{-1}$ is a one-sample delay at the multiple sampling rate.

The quantity dB(m) represents the shift quantity of the center frequency calculated from the internal variables x,y, which were referenced at the single sampling rate timing. The shift quantity dB(m) of the center frequency can be regarded as an estimate of the difference between the current center frequency and the oscillation frequency. HDC/MPU 23 repeatedly estimates the oscillation frequency by using Equation 3 and updates the center frequency, and the center frequency gradually approaches the oscillation frequency.

When m is replaced by M×n in Equation 3 above, the following Equation 4 can be obtained.

$$dB(m)=\Delta B\times((1-z^{-M})\times x(M\times n-1))\times((1-z^{-M})\times y(M\times n))=$$
$$(1-z^{-M})^2\times\Delta B\times x(M\times n-1)\times y(M\times n) \quad \text{(Equation 4)}$$

Equation 4 can be represented by the following Equation 5.

$$dB(n)=(1-z^{-M})^2\times\Delta B\times x(n-1)\times y(n),\text{ If n=m}$$

$$dB(n)=0,\text{ If n}\neq\text{m} \quad \text{(Equation 5)}$$

The differences between Equation 5 and Equation 2 are the term $(1-z^{-M})^2$ in Equation 5 and the sampling times for fetching the internal variables x,y. Since the result of the $(1-z^{-M})^2$ calculation (filter) is positive, Equation 5 can be used in the estimation of the oscillation frequency, similar to Equation 2. The calculation by Equation 5 can use only the internal variables x,y values referenced at the single sampling rate timing and can determine the shift quantity of the center frequency (estimate of the center frequency).

The adaptive chasing notch filter 233 is a two-dimensional filter. HDC/MPU 23 can obtain one output internal variable y(m) and two input internal variables x(m),x(m−1) at the single sampling rate times. The value of x(m−1) is the internal variable x delayed by one sample from x(m) at the multiple sampling rate. As shown in Equation 3, HDC/MPU 23 can use the internal variables x(m−1),y(m) referenced at the single sampling rate timing to estimate the oscillation frequency.

Equation 3 calculates the product of $((1-z^{-M}) \times x(m-1))$ and $((1-z^{-M}) \times y(m))$. The operator $z^{-M}$ is a delay of M samples at the multiple sampling rate. That is, this operator is delayed by one sample at the single sampling rate. Equation 3 calculates the difference $((1-z^{-M}) \times x(m-1))$ between the values of internal variable x at different sampling times and the difference $((1-z^{-M}) \times y(m))$ between the values of internal variable y at different sampling times. These subtraction processes remove the DC components from the internal variables x,y.

From the calculation process according to Equation 3, HDC/MPU 23 can reference the internal variables of the adaptive chasing notch filter 233 operating at the multiple sampling rate and estimate the oscillation frequency (and the update of the center frequency). In addition, from the calculation process according to Equation 3, HDC/MPU 23 can remove the DC components from the internal variables x,y and appropriately estimate the oscillation frequency.

Equation 3 calculates the differences of the internal variables offset by one multiple rate sample. HDC/MPU 23 may use the difference of the internal variables offset by only 2 or more multiple rate samples. Namely, $z^{-kM}$ may be used in place of $z^{-M}$, where k is an integer of at least 2. However, in one embodiment, the DC components are removed by calculating the differences of the internal variables offset by one multiple rate sample as in the calculation in Equation 3 because the calculation is simpler and more accurate.

From the calculation of Equation 3, HDC/MPU 23 can reference at the simple sampling rate the internal variables of the adaptive chasing notch filter 233 operating at the multiple sampling rate by using a simple calculation (filter structure), remove the DC components, and estimate the oscillation frequency.

As described above, in the adaptation of the adaptive chasing notch filter 233, it is important to note that the suppression target is the oscillation of the actuator 16. The oscillations caused by the actuator oscillations are eliminated when the oscillation conditions are removed. When the adaptive chasing notch filter 233 approaches the oscillation frequency, the skirt of the filter overlaps the oscillation frequency and the oscillation stops. HDC/MPU 23 cannot estimate higher oscillation frequencies. Thus, the offset between the center frequency of the notch filter 233 and the oscillation frequency becomes larger. As a result of the offset, the filter width widens without necessarily becoming the specified minimum value.

Figure 4:
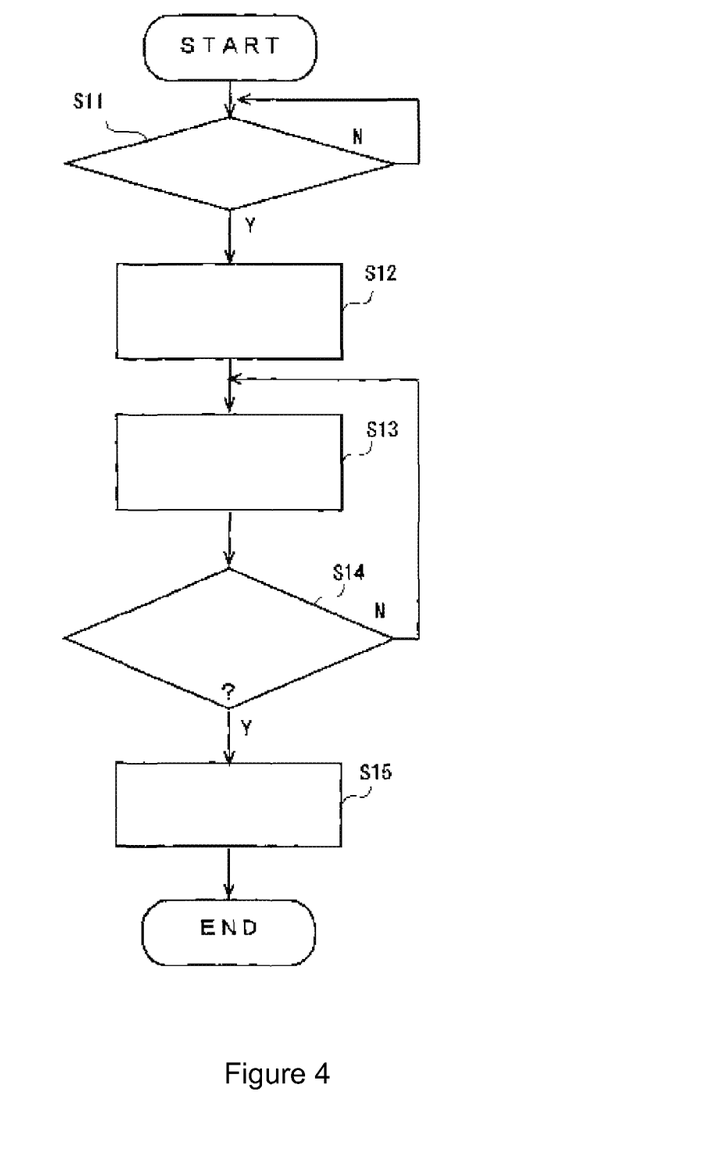
FIG. 4 is a flow chart showing the flow of the adaptation process of the adaptive chasing notch filter, in accordance to an embodiment of the present invention.

As shown in the flow chart in FIG. 4, in one embodiment, HDC/MPU 23 inserts the adaptive chasing notch filter 233 in the servo loop (S12) if the oscillations start (Y in S11). If the oscillations do not start (N in S11), the notch filter 233 is set to pass through.

When the notch filter 233 is passed through, the notch filter 233 is not in the servo loop (without the filter calculation, the unchanged input becomes the output), or the coefficients are given so that the characteristic of the notch filter 233 becomes equivalent to the state where the notch filter is not in the servo loop (filter calculation where the input and the output become equal). The presence or absence of oscillations can be determined by using position error signal (PES).

After the adaptive chasing notch filter 233 is inserted in the servo loop, HDC/MPU 23 adapts the notch filter 233. Specifically, the oscillation frequency is estimated, and the center frequency of the notch filter 233 is matched to that frequency. The adaptive chasing notch filter 233, which is inserted in the servo loop, has a width within the specification (half width) in the initial state. In one embodiment, that width is zero. When the width is zero, the notch filter 233 does not exhibit the action of a filter in servo loop state.

HDC/MPU 23 estimates the oscillation frequency of the notch filter 233 while maintaining the width within the specification (while holding at zero) (S13). As described above, HDC/MPU 23 references the internal variables of the notch filter 233 at the single sampling rate timing, and uses the x(m−1)×y(m) to repeatedly estimate the oscillation frequency and update the center frequency. When the center frequency converges at the oscillation frequency (Y in S14), HDC/MPU 23 widens the width of the notch filter 233 (S15). The center frequency which converges at the oscillation frequency is within the specified range from the oscillation frequency. Specifically, the difference between the center frequency and the oscillation frequency is within a preset range.

Thus, the oscillation frequency can be estimated while the width of the adaptive chasing notch filter 233 is maintained within the specified values, and the width widens after the estimation ends, and the center frequency of the adaptive chasing notch filter 233 can approach closer to the oscillation frequency.

Figure 5:
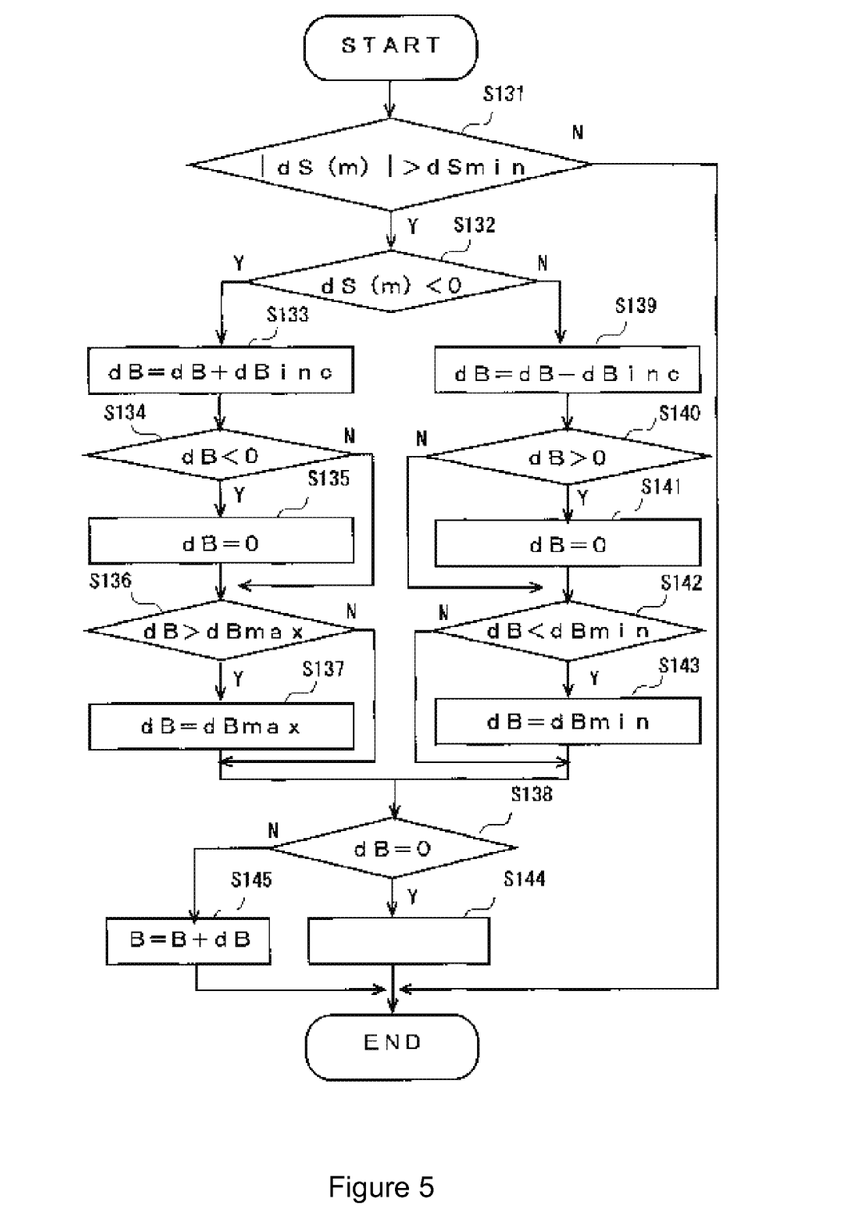
FIG. 5 is a flow chart showing the method for adjusting the center frequency of the adaptive chasing notch filter, in accordance to an embodiment of the present invention.

An estimation method of the oscillation frequency in step S13 is specifically described with reference to the flow chart in FIG. 5. HDC/MPU 23 uses dS(m) which is represented by the following Equation 6.

$$dS(m) = ((1-z^{-M}) \times x(m-1)) \times ((1-z^{-M}) \times y(m)) \quad \text{(Equation 6)}$$

The right side of Equation 6 is ΔB removed from the right side of Equation 3.

If the absolute value |dS(m)| of dS(m) is greater than the specified value $dS_{min}$ (Y in S131), HDC/MPU 23 continues to estimate the frequency and calculate the center frequency update. Under this condition, the oscillations of the actuator 16 continue. When |dS(m)| is less than $dS_{min}$ (N in S131), the frequency estimation process is not conducted. Next, HDC/MPU 23 determines the sign of dS(m) (S132). If dS(m) is less than 0 (Y in S132), the oscillation frequency is less than the center frequency. Conversely, if dS(m) is greater than 0 (N in S132), the oscillation frequency is greater than the center frequency. In the notch filter represented by Equation 1, the center frequency decreases as the value of coefficient B increases.

The case when the center frequency is less than the oscillation frequency is described below. Namely, this is the case when dS(m) is less than 0 (Y in S132). HDC/MPU 23 calculates the update quantity dB of the center frequency and updates the center frequency (S133). The update quantity dB of the center frequency is the value of dBinc added to the previous update quantity. The dBinc is a positive number and a constant number. The initial value of the update quantity dB of the center frequency is the specified value, for example, zero.

Next, HDC/MPU 23 determines the sign of dB (S134). When dB is less than 0 (Y in S134), HDC/MPU 23 sets dB to 0 (S136). In this example, since dB is greater than or equal to 0 (N in S134), HDC/MPU 23 maintains the value calculated in step S133 as dB. HDC/MPU 23 maintains dB lower than the specified dBmax (S136, S137). The dBmax value is the positive specified value.

HDC/MPU 23 determines whether dB is 0 or not (S138), if not 0 (N in S138), the coefficient B is updated. The series of processes is repeated for each servo at the single sampling rate. After the previous center frequency is updated, the center frequency is less than the oscillation frequency (Y in S132).

HDC/MPU 23 adds dBinc to the update quantity of the previous center frequency and calculates the current update quantity of the center frequency (S133). Thus, the update quantity of the center frequency increases in response to the number of times that the sign of dB continues. As described above, dB is maintained below dBmax (S136, S137). Since dB is positive (N in S134), HDC/MPU 23 maintains the value calculated in step S133 as dB.

Next, HDC/MPU 23 determines whether dB is 0 or not (S138). Since dB is not 0 (N in S138), HDC/MPU 23 updates the coefficient B (S145). By repeating steps S132 to S138 for each servo, the center frequency approaches the oscillation frequency and becomes the larger value. At this time, dS(m) is greater than 0 (N in S132). HDC/MPU 23 subtracts dBinc from the previous update quantity dB of the center frequency and determines the current update quantity (S139).

HDC/MPU 23 determines the sign of dB (S140). In this example of the process, since dB is greater than 0 (Y in S140), HDC/MPU 23 sets dB to 0 (S141). Since dB is greater than or equal to dBmin (N in S142), HDC/MPU 23 maintains dB at 0 (step S143 is skipped). The value of dBmin is the negative specified value.

HDC/MPU 23 determines whether dB is 0 or not (S138). Since dB is 0 (Y in S138), HDC/MPU 23 calculates the width W (S144). In the example of the process described above, a center frequency smaller than the oscillation frequency gradually increases and finally exceeds the oscillation frequency. At this time, the center frequency and the oscillation frequency can be regarded as roughly matched (a difference in the desired range). Therefore, HDC/MPU 23 calculates the width W. When the center frequency roughly matches the oscillation frequency, the sign of dS(m) changes frequently. Each time the sign changes, dB=0, and the width W is frequently calculated instead of the frequency estimation process. Namely, after the center frequency converges at the oscillation frequency and the frequency estimation process ends, the process for calculating the width W is conducted.

When the initial value of the center frequency is greater than the oscillation frequency, the processes by the HDC/MPU 23 become the reverse of the processes described above. HDC/MPU 23 repeats steps S132 to S143 and step S138 to decrease the center frequency (S139). This update quantity dB is maintained in the range above dBmin (S142, S143). If the center frequency is less than the oscillation frequency (Y in S132), dB=0, and HDC/MPU 23 calculates the width W (S144). When the center frequency roughly matches the oscillation frequency, the sign of dS(m) changes frequently, and dB=0 each time. Therefore, the width W is calculated frequently instead of the frequency estimation process. Namely, after the frequency estimation process essentially ends, the process for calculating the width W is conducted.

As described above, the adaptive chasing notch filter 233 is calculated only when HDC/MPU 23 is |dS(m)|>$dS_{min}$ (Y in step S131). When |dS(m)|<$dS_{min}$, since the absolute value of dS(m) is small, the sign of dS(m) is easily changed by noise. Therefore, HDC/MPU 23 updates B only when |dS(m)| is larger. After the oscillations end, the offset of the B value caused by noise and resumption of the oscillations are prevented. Thus, when the oscillations stop, |dS(m)|<$dS_{min}$, straying of the notch filter 233 is prevented.

In the frequency estimation calculation, the absolute value of the shift quantity dB of the center frequency increases in response to the number of times that the dS sign continues. Thus, the absolute value of dB varies, and the convergence characteristic of the center frequency to the oscillation frequency is improved. In addition, since the variation range of the shift quantity dB (maximum value of the absolute value of the shift quantity) is specified by dBmax and dBmin, the center frequency can be prevented from having a large offset from the oscillation frequency caused by an excessive shift.

As described above, from the |dS(m)|>$dS_{min}$ condition, the dS value is difficult for noise to affect. Therefore, the sign of dS changes only when the magnitude relationship of the oscillation frequency and the center frequency of the notch filter 233 changes. At this time, the difference between the oscillation frequency and the center frequency is a small value within the desired range and can be regarded as matching. Thus, after the oscillation frequency is essentially identified and the estimation process ends, HDC/MPU 23 starts the calculation of the half width W of the notch filter 233.

In one embodiment, a method for calculating the half width W of the notch filter 233 is described below with reference to the flow chart in FIG. 6. HDC/MPU 23 sets the value of the width W to the desired value which can gradually increase beginning from the W value in the frequency estimation and stop the oscillations. In one embodiment, the initial value of W is 0. In addition, In one embodiment, HDC/MPU 23 updates the value of the width W in the servo sampling. Specifically, HDC/MPU 23 adds the update quantity dW to the current width W in the servo sampling. The update quantity dW is a positive or negative value and includes the sign.

Figure 6:
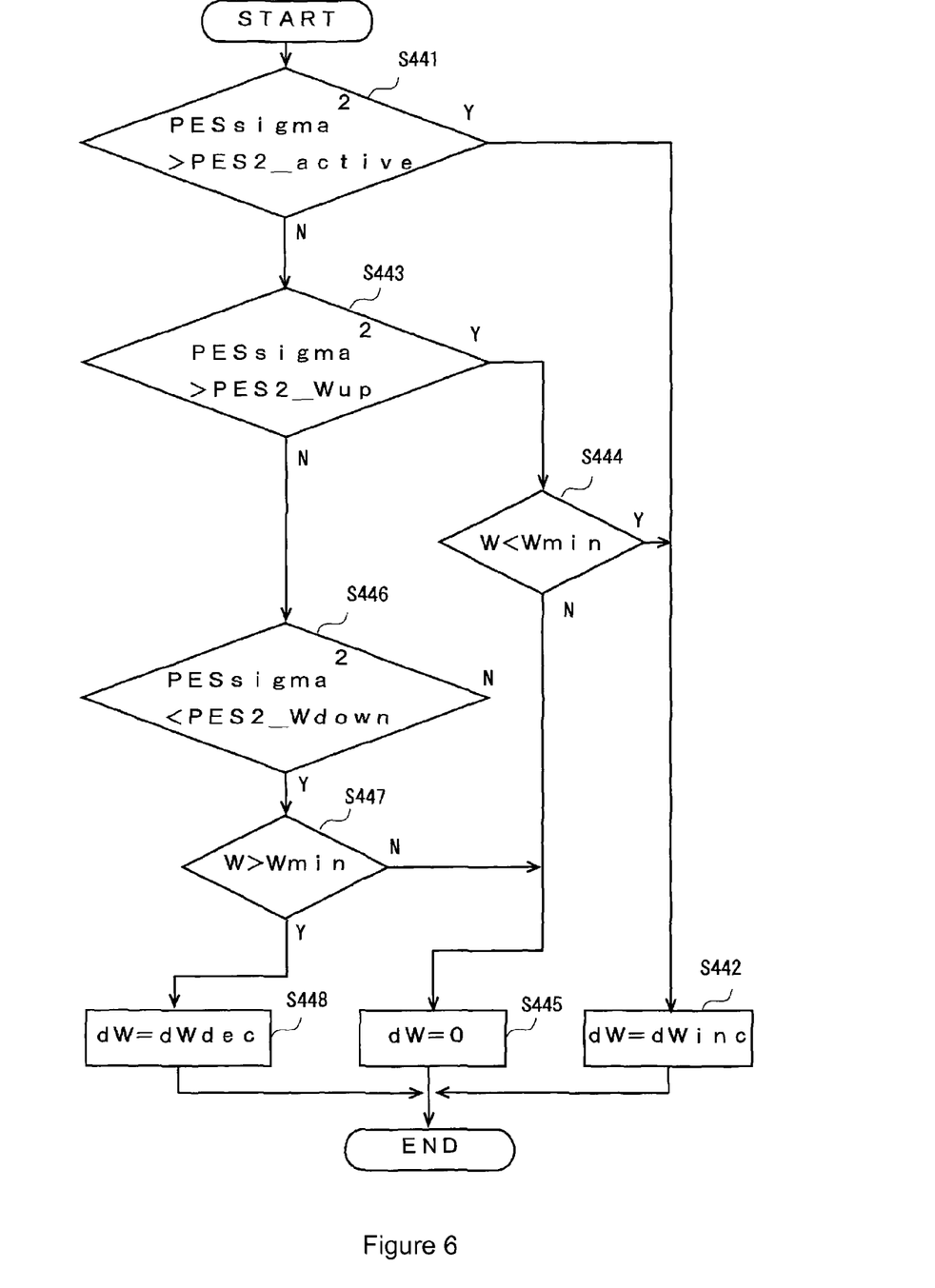
FIG. 6 is a flow chart showing the method for determining the width of the adaptive chasing notch filter, in accordance to an embodiment of the present invention.

As shown in FIG. 6, in one embodiment, HDC/MPU 23 uses PES to judge whether there are oscillations. In this example, HDC/MPU 23 uses the variance of PES (PES-sigma$^2$). Specifically, if PESsigma$^2$>PES2_active (Y in S441), the judgment of HDC/MPU 23 is that oscillations are starting (are not stopping). PES2_active is the specified constant.

At this time, HDC/MPU 23 sets the update quantity dW of the width W to dWinc (S442). dWinc is a positive constant. dWinc may be a function of some variable. In this case, the value of the function is a positive number. HDC/MPU 23 may judge whether oscillations are present or not from the function value of PES which is different than the PES variance, or the magnitude of the actuator oscillations.

If PESsigma$^2$ is less than PES2_active (N in S441), the judgment of HDC/MPU 23 is that the oscillations are stopping. However, if the PESsigma$^2$ is a value close to PES2_active, in one embodiment, the width W in the available range is larger, and the margin is maintained in the notch filter.

When PESsigma$^2$>PES2_Wup (Y in S443), if the width W is less than Wmin (Y in S444), HDC/MPU 23 sets the update quantity dW to dWinc (S442). Namely, HDC/MPU 23 increases the width W so that the width approaches Wmin. Wmin can be the value of the specified constant added to the width W which initially satisfied a function of the center frequency or the condition of step S441. Thus, by increasing the width W to approach Wmin, the margin can be maintained by the notch filter.

When the width W is greater than Wmin (N in S444), HDC/MPU 23 sets the update quantity dW to 0, namely, the width W does not change and is maintained (S445). The causes of the useless increase in the width W are the decrease in the phase margin in the servo system and the drop in servo performance.

When the PES2_Wup is ≥PESsigma$^2$ (N in S443), the margin for preventing oscillations is guaranteed. Consequently, HDC/MPU 23 maintains the width W and does not increase its value (S445), or decreases the value (S448). dWdec in step S448 is a negative constant. dWdec may be a function of some variable. In this case, the value of the function is a negative number.

Specifically, when $PES2\_Wup \geq PESsigma^2 > PES2\_Wdown$ (N in S443 and N in S446), HDC/MPU 23 sets dW to 0 and maintains the current width W (S445). PES2_Wdown in S446 is a positive number no more than PES2_Wup and is a number which differs from or is identical to PES2_Wup.

When $PES2\_Wup \geq PESsigma^2$, the oscillations of the actuator 16 are suppressed. However, when $PESsigma^2 > PES2\_Wdown$, the decrease in the width W of the notch filter 233 increases the probability of oscillations of the actuator 16 starting. Consequently, in one embodiment, HDC/MPU 23 sets dW to 0 and maintains the current width W (S445).

When $PESsigma^2 < PES2\_Wdown$ (Y in S446) and W>Wmin (Y in S447), HDC/MPU 23 sets dW to dWdec to decrease the width W (S448). When $PESsigma^2 < PES2\_Wdown$, the width W of the notch filter 233 has sufficient magnitude. Furthermore, when W>Wmin, HDC/MPU 23 decreases the width W so that the width approaches Wmin. Thus, the phase margin in the servo system can be increased, and the servo system can be more stable.

When W of the notch filter 233 is less than Wmin (N in S447), the width W is sufficiently small in order to ensure the phase margin of the servo system. Therefore, as in this example of the structure, in order to more reliably prevent the oscillations of actuator 16, in one embodiment, HDC/MPU 23 sets dW to 0 and maintains the current width W (S445).

If the width W of the notch filter 233 is too large, the servo system becomes unstable. Consequently, the width W is set to the maximum value Wmax. HDC/MPU 23 conducts the processes described with reference to FIG. 6 in the servo sampling and determines the update quantity of the width W. HDC/MPU 23 adds the update quantity dW to the current width W, but if that value is greater than Wmax, the width W is set to Wmax.

In one embodiment, the maximum value Wmax is a function of the center frequency. When the maximum value Wmax is constant regardless of the center frequency, the phase delay quantity is changed by the center frequency. Therefore, the notch filter 233 is difficult to generate so that the phase margin of the servo system becomes larger than the specified value. When the maximum value Wmax is a function of the center frequency, the HDC/MPU 23 can give the maximum to the phase delay quantity due to the generated notch filter 233. Therefore, the phase margin of the servo system can easily be held in a larger range than the specified values.

Next, the method for generating the adaptive chasing notch filter 233 is explained. From the method described above, the center frequency and the width (half width) of the notch filter 233 are determined. HDC/MPU 23 generates the notch filter 233 from these values and the gain at the center frequency. As described above, the notch filter 233 can be represented by Equation 1.

HDC/MPU 23 generates each coefficient K, E, F, B, C of the notch filter 233 from the B which represents the center frequency, the width W, and the depth D (gain at the center frequency). In one embodiment, the depth D is given by a constant number. Each coefficient can be generated by the following equations.

$$K = 1 - W \quad \text{(Equation 7)}$$

$$C = 1 - 2 \times D \quad \text{(Equation 8)}$$

$$E = -K \times B \quad \text{(Equation 9)}$$

$$F = C + 2 \times W \quad \text{(Equation 10)}$$

The depth D is the gain at the center frequency of the notch filter and satisfies the following condition. When W is 0, the characteristic of the notch filter 233 is pass through.

$$1 \gg D \geq 0 \quad \text{(Equation 11)}$$

In addition, because the maximum Wmax of the width W is defined by a function of the center frequency, the width W satisfies the following condition.

$$1 \gg W\max(B) \geq W \geq 0 \quad \text{(Equation 12)}$$

When either the width W or the depth D is 0, the other is a value greater than 0. Thus, the gain characteristic until the internal variable is prevented from becoming infinity.

An example of the function (function of B) of the center frequency of width W is the following function.

$$W\max(B) = w0 + w1 \times (B0 - B), B < B0;$$

$$W\max(B) = w0, B \geq B0, \quad \text{(Equation 13)}$$

where $1 \gg w0 \geq 0$ holds, and w0, w1, and B0 are constants.

In accordance with the preceding description, HDC/MPU 23 can generate an appropriate adaptive chasing notch filter 233 corresponding to the oscillation frequency of the actuator 16. The adaptive chasing notch filter 233 implemented in the HDD 1 as a product can effectively suppress the oscillations of the actuator 16 which were generated in response to the state of the system implementing the filter or the environmental changes.

In the manufacturing steps, HDD 1 can use the adaptive chasing notch filter 233. In the testing steps in the manufacturing of the HDD 1, HDC/MPU 23 stops the oscillations of the actuator 16 by adapting the adaptive chasing notch filter 233. HDC/MPU 23 generates a new fixed notch filter (time-invariant notch filter) based on the center frequency and the width of the adaptive chasing notch filter 233 and adds the filter to the servo system. Therefore, the notch filter required because of the fluctuations of each drive can be set individually.

For example, HDD 1 has one or a plurality of fixed notch filters shared by all HDDs having the same design, one or a plurality of fixed notch filters having individual settings, and an adaptive chasing notch filter 233. The notch filters having individual settings are passed through before being set. As described above, HDC/MPU 23 determines the coefficients of the adaptive chasing notch filter 233 which stops the oscillations of the actuator 16. HDC/MPU 23 determines the coefficients for a notch filter having individual settings from the determined coefficients and sets these coefficients in the notch filter having individual settings. Thus, the fixed notch filter is inserted in the servo system.

In one embodiment, HDC/MPU 23 sets a width W greater than the width W of the adaptive chasing notch filter 233, which stopped the oscillations, in the notch filter having individual settings. Thus, the margin is ensured. In addition, in the frequency band which should ensure the gain and margin, HDC/MPU 23 increases the portion corresponding to the margin which should ensure the gain of the frequency band in the filter for promoting oscillations. HDC/MPU 23 removes the filter for promoting oscillations after the notch filter having individual settings is set. Thus, the margin which should be guaranteed can be reliably guaranteed.

The region where the notch filter is added changes depending on the design of the HDD. Various embodiments of the methods can be applied to disk drives other than HDDs, and it does not matter whether or not the disk is fixed in a cabinet. It is important for the center frequency of the notch filter to be in the vicinity of the oscillation frequency of the actuator, but the center frequency is not necessarily limited to matching.

Various embodiments of the present invention are thus described. While the present invention has been described in particular embodiments, it should be appreciated that the present invention should not be construed as limited by such embodiments, but rather construed according to the following claims.

The invention claimed is:

1. A disk drive comprising:
   a head for accessing a disk,
   an actuator for moving said head in a radial direction of said disk, and
   a controller for servo control of said actuator based on servo data read out from said disk by said head, wherein said controller is configured for maintaining a width of an adaptive chasing notch filter below a specified value in servo system control and estimating an oscillation frequency of said actuator, wherein said controller compares a magnitude of a value in a calculation of said estimate of said oscillation frequency to a threshold, and estimates said oscillation frequency and updates a center frequency of said adaptive chasing notch filter when said value is greater than said threshold, and wherein said controller compares a function value representing said oscillations of said actuator and a first threshold to judge whether said oscillations have stopped, and increases said width when said function value is between a second threshold which is less than said first threshold, and a value of said width of the adaptive chasing notch filter which stops said oscillations is less than a Wmin value, wherein said Wmin value is greater than said value of said width which stops oscillations to said width of said adaptive chasing notch filter.

2. The disk drive of claim 1, wherein said controller is further configured for moving a center frequency of said adaptive chasing notch filter closer to said oscillation frequency.

3. The disk drive of claim 1, wherein said controller is further configured for increasing an updated quantity of said center frequency in response to a number of consecutive updates of said center frequency.

4. The disk drive of claim 3, wherein a maximum value for a absolute value of said update quantity of said center frequency is specified.

5. The disk drive of claim 1, wherein said controller uses a function value representing said oscillations of said actuator, when a position error signal is the variable, to judge whether said oscillations of said actuator have stopped, and
   said width of said adaptive chasing notch filter is determined from a value of said width for stopping said oscillations.

6. The disk drive described in claim 1, wherein said controller decreases said width when said function value is less than a third threshold which is less than said second threshold, and the value of said width is greater than said value Wmin.

7. The disk drive described in claim 1, wherein a maximum value of said width is specified, and
   said controller determines said width so that said width is less than said maximum value.

8. The disk drive of claim 7, wherein said maximum value is represented by a function of said center frequency of said adaptive chasing notch filter.

9. The disk drive of claim 1, wherein said controller uses filter coefficients determined by adaptation of said adaptive chasing notch filter to set a new fixed notch filter.

10. The disk drive of claim 1, wherein said adaptive chasing notch filter operates at a multiple sampling rate.

* * * * *